United States Patent [19]
Langer et al.

[11] Patent Number: 5,819,910
[45] Date of Patent: Oct. 13, 1998

[54] NOISE REDUCED STEP CHAIN SPROCKET

[75] Inventors: Hans-Jürgen Langer, Hespe; Martin Mehlert, Nienstaedt, both of Germany

[73] Assignee: Otis Elevator Company, Farmington, Conn.

[21] Appl. No.: 677,699

[22] Filed: Jul. 10, 1996

[51] Int. Cl.[6] .................................................. B65G 23/06
[52] U.S. Cl. ............................ 198/834; 198/330; 474/61
[58] Field of Search ................................... 198/330, 834; 474/61, 60, 152, 153

[56] References Cited

U.S. PATENT DOCUMENTS

| | | | |
|---|---|---|---|
| 975,938 | 11/1910 | Downey . | |
| 1,173,076 | 2/1916 | Winski . | |
| 2,686,585 | 8/1954 | Margles et al. | 198/16 |
| 2,953,930 | 9/1960 | Meyer | 74/216.5 |
| 3,016,757 | 1/1962 | Kornylak | 74/243 |
| 3,052,133 | 9/1962 | Bradley | 74/243 |
| 3,311,220 | 3/1967 | I'Anson | 198/168 |
| 3,499,340 | 3/1970 | Teranishi et al. | 74/229 |
| 3,889,550 | 6/1975 | Boggs et al. | 74/443 |
| 4,022,072 | 5/1977 | Chagawa et al. | 74/243 |
| 4,227,422 | 10/1980 | Kawashima et al. | 474/156 |
| 4,261,214 | 4/1981 | Watanabe et al. | 474/156 |
| 4,278,303 | 7/1981 | Livesay | 305/57 |
| 4,332,574 | 6/1982 | Aoyama et al. | 474/161 |

FOREIGN PATENT DOCUMENTS

| | | |
|---|---|---|
| 3223118A1 | 10/1981 | Germany . |
| 3239844A1 | 11/1981 | Germany . |
| 4229238A1 | 9/1991 | Germany . |
| 9203944.8 | 3/1992 | Germany . |

*Primary Examiner*—Joseph E. Valenza
*Assistant Examiner*—Khoi H. Tran

[57] ABSTRACT

In a drive sprocket of a passenger conveyer, such as an escalator, having a step chain, the sprocket is provided with an overlay attached to the side of the drive sprocket. The overlay cushions the chain as it engages the drive sprocket teeth to thereby minimize the noise generated by the engagement of the drive sprocket and the step chain. In a particular embodiment, a drive sprocket further includes a plate that provides lateral support of the overlay during engagement with the step chain.

16 Claims, 3 Drawing Sheets

NOISE REDUCED STEP CHAIN SPROCKET

TECHNICAL FIELD

This invention relates to passenger conveyors in general, and more particularly to passenger conveying devices that employ a drive chain engaged with a sprocket.

BACKGROUND OF THE INVENTION

An escalator comprises a frame, balustrades with movable handrails, tread plates, a drive system and a step chain for propelling the tread plates. The frame comprises a truss section on both left and right hand sides of the frame. Each truss section has two end sections forming landings, connected by an inclined midsection. The upper landing usually houses the escalator drive motor positioned between the trusses.

The drive system of an escalator typically consists of a step chain, a step chain drive sprocket, an axle and a drive motor. The drive motor propels the step chain drive sprocket which imparts motion to the step chain. The step chain travels a continuous, closed loop, running from one elevation to the other elevation, and back.

The step chain consists of a pair of chain strands and a plurality of connecting axles for connecting the two chain strands. Each strand is formed from a plurality of chain links. Each link has a pair of side plates, a pin and a bushing. The side plates of one link are attached, by the pin, to the bushing and the side plates of the next link in line. The bushing is disposed in a bearing relationship to the pin to permit relative rotation of the pin and bearing. In this way, adjacent links may pivot about the pin. This link arrangement is repeated as many times as necessary to arrive at the length chain required.

Escalators are an efficient means of moving large numbers of people quickly and safely. Everyone can be moved continuously with minimal waiting and people are carried efficiently from one place to another. High rise, heavy duty escalators are used out of doors to move large numbers of people. Due to its heavy load, such high rise escalators are constructed mostly of metal parts. One of the problems encountered with such escalators is the creation of noise. As the metal bushings of the step chain engage the metal drive sprocket teeth, there is metal to metal contact which produces noise. Since escalators are generally used in places where large numbers of people are moving, it is desirable that escalators operate as quietly as possible.

One approach to reducing the noise created by escalator operation is typified by U.S. Pat. No. 3,499,340, entitled "Driving Apparatus For Moving Stairways" and issued to Teranishi. Teranishi discloses a resilient insert placed into a circular hole at the root of the sprocket teeth. The insert projects above the root area by an amount sufficient to engage the bushing before it contacts the bottom of the root area. However, this invention is only partially successful. Teranishi only cushions the metal to metal contact which occurs at the midsection of the sprocket teeth because the insert covers a discrete portion of the root area. The bushing may still make its initial contact with the root area not covered by the resilient insert. Therefore, Teranishi only partially reduces the undesirable noise produced by the metal to metal contact.

Another approach is exemplified by U.S. Pat. No. 975,938, entitled "Sprocket Gear" and issued to Downey. Downey discloses a flange attached on both sides of the drive sprocket and an elastic cushion, in the form of a ring, placed into the flange. This ring engages the side plate of the chain links and thereby attempts to cushion the metal to metal contact between the bushing and the root area of the sprocket by supporting only the side plates of the chain links.

Neither of these approaches is completely satisfactory. What is needed is a durable mechanism for minimizing the noise produced by the metal to metal contact between the bushing and the drive sprocket.

DISCLOSURE OF THE INVENTION

It is therefore, an object of the present invention to provide means of cushioning the contact between the sprocket teeth and the step chain bushing that minimizes the noise produced by the step chain contacting the drive sprocket.

It is further an object of the present invention to provide means of cushioning the contact between the drive sprocket and the step chain bushing that is durable and resistant to deformation from continuous use.

According to the present invention, a flexible overlay extends across adjacent drive sprocket teeth and above the root of the drive sprocket teeth such that the chain engages the overlay prior to engaging the drive sprocket.

The overlay is shaped to the contour of the sprocket teeth, but protrudes above the root area. This feature allows the overlay to make complete contact with the bushing, regardless of the location in the root area of initial contact between the bushing and the sprocket. An advantage of this feature is it enables the bushing to make cushioned contact with the root area even if the bushing is not centered in the root area.

According to an aspect of the present invention, a plate is disposed alongside the overlay. The plate is aligned with the contours of the drive sprocket teeth and has a channel along its rim to receive the overlay as it plastically deforms under the load of the bushing.

In this embodiment of the invention, the plate does not directly receive the load of the bushing and thus tends to remain rigid and not deform. The stiffness of the plate supports the overlay when the overlay is under pressure from the bushing. An advantage of this feature is it increases the durability of the overlay.

It should be noted that "passenger conveyor" as used herein is defined to include both escalators and moving walks.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
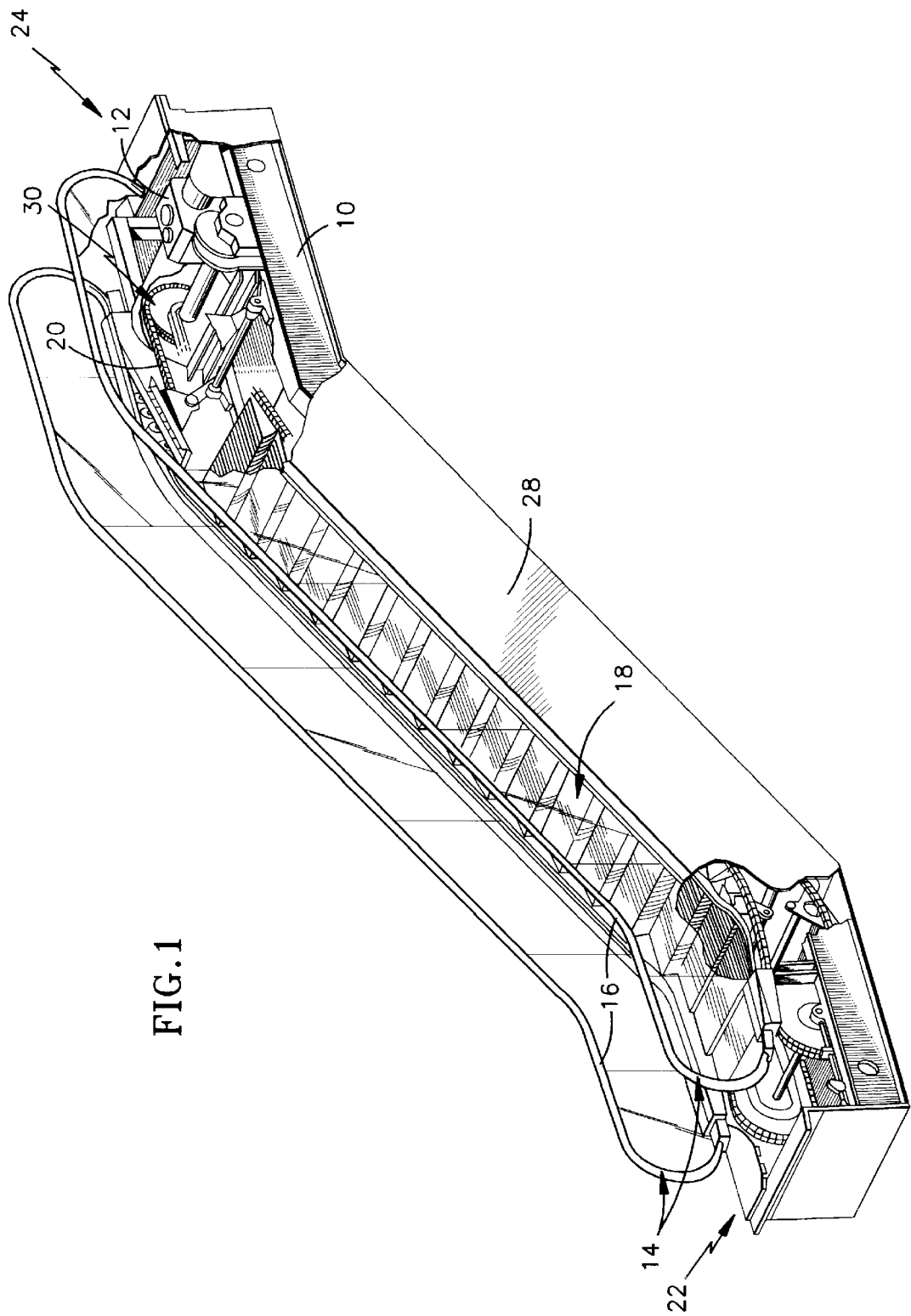
FIG. 1 an isometric view of an escalator with broken away sections shown in detail.

Referring to FIG. 1, an escalator is shown having a frame 10, a drive motor 12, a pair of balustrades 14 for guiding a pair of movable handrails 16, a plurality of tread plates 18, a step chain 20, a first landing 22, and a second landing 24. The frame 10 consists of a weldment of structural steel angularly extending from the first landing 22 to the second landing 24. The frame 10 forms the structural basis for the landing on each elevation. Hence, the frame 10 begins with the first landing 22 at a lower elevation, then angularly extends upward via an inclined midsection 28 to the second landing 24. The second landing 24 typically provides the support for the drive motor 12.

The step chain drive sprocket 30 is driven by the drive motor 12 and engaged with the step chain 20. The step chain drive sprocket 30 consists of the sprocket body 44, the root area 46, the sprocket teeth 48, the overlay 50, and the plate 52 (see FIG. 3).

Operation of the drive motor 12 causes the step chain drive sprocket 30 to rotate and this rotation imparts motion to the step chain 20. The tread plates 18 are pivotally attached to the step chain 20 and thus follow the closed loop path of the step chain 20, running from one elevation to the other elevation, and back.

Figure 2:
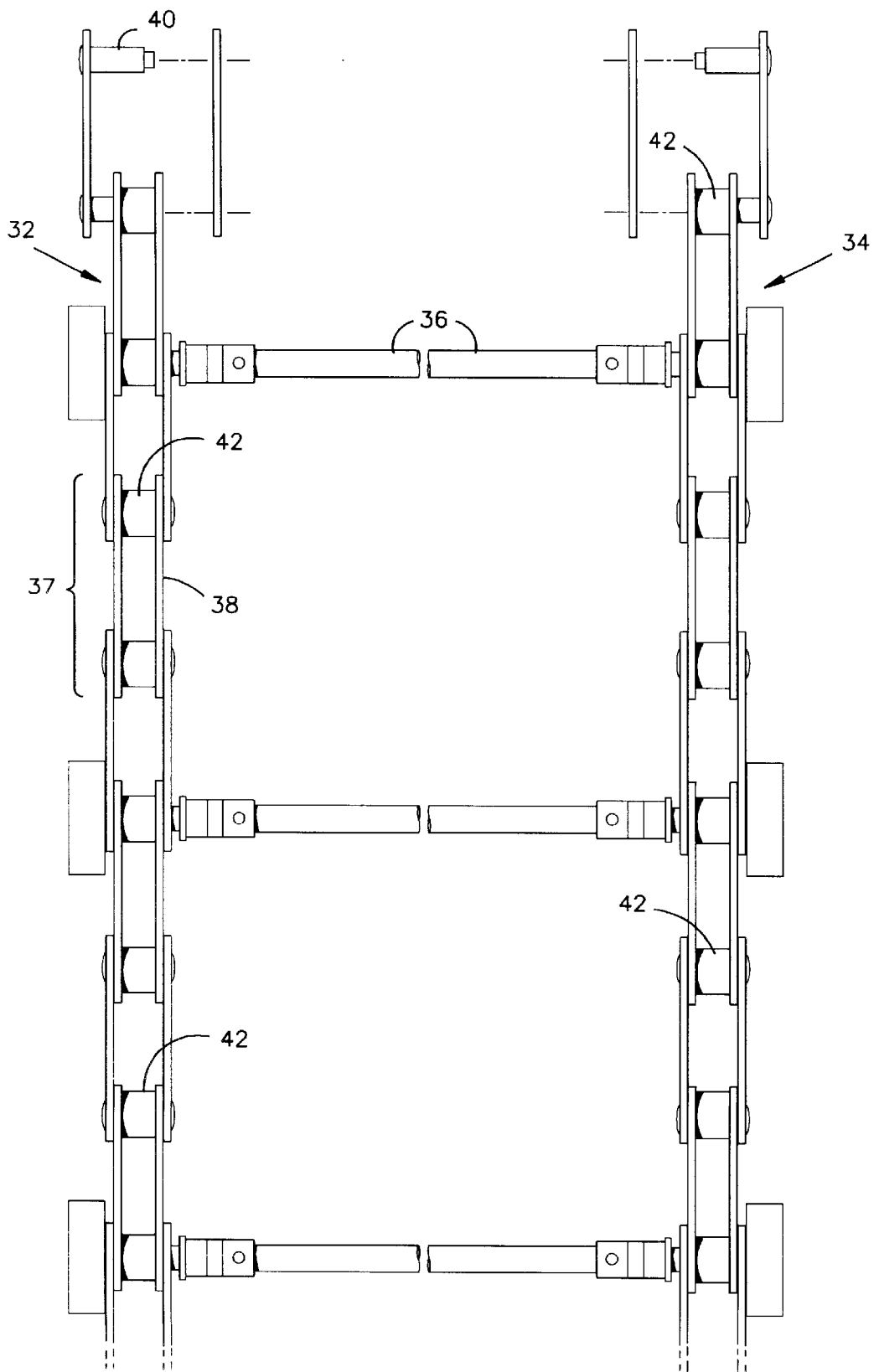
FIG. 2 a top view of the step chain.

Referring now to FIG. 2, the step chain 20 comprises a left strand 32 and a right strand 34 and a plurality of connecting axles 36. The strands 32,34 comprise a plurality of links 37 pivotally attached to one another. Each link 37 has a pair of side plates 38, a pin 40 and a bushing 42. The bushing 42 engages the step chain drive sprocket 30, and as the step chain drive sprocket 30 turns, the step chain 20 is propelled.

Figure 3:
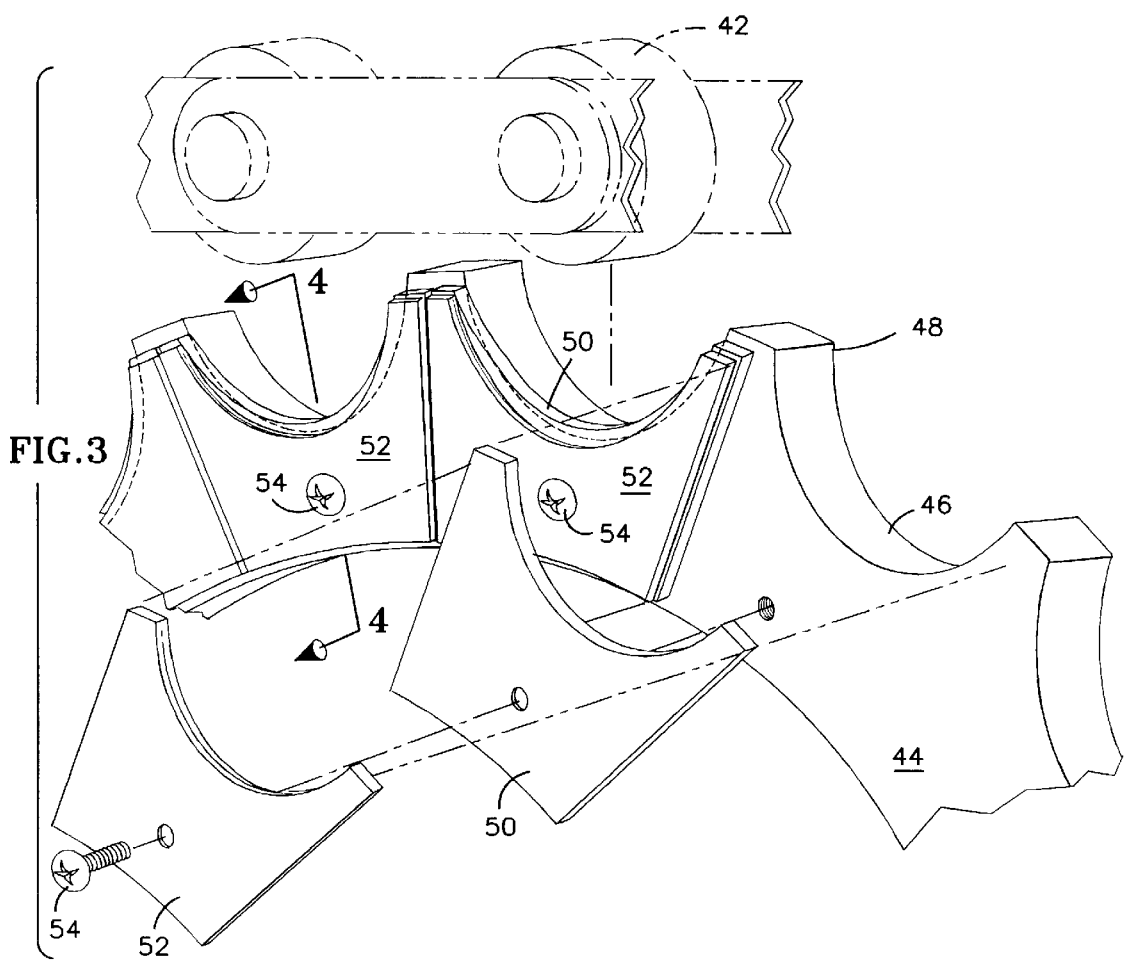
FIG. 3 a perspective view of the drive sprocket with the step chain in background.

Referring now to FIG. 3, the overlay 50 is shaped generally to the contour of the sprocket teeth 48, but protrudes radially outward and substantially above the root area 46, and extends along the entire root area 46 between adjacent teeth. The overlay 50 is attached to the side of the step chain drive sprocket 30 by means of a detachable fastener 54. A suggested material for the overlay 50 is polyurethane, which has sufficient elasticity to enable the overlay 50 to plastically deform under the load of the step chain 20. The bushing 42 makes contact with the overlay 50 prior to contacting the root area 46 thus the overlay 50 cushions the contact between the bushing 42 and the root area 46.

The plate 52 is aligned with the contour of the drive sprocket teeth 48. The detachable fastener 54 connects the overlay 50 and the plate 52 to the side of the step chain drive sprocket 30. The plate 52 is made of steel which gives the plate 52 sufficient stiffness to support the overlay 50 when it engages the step chain 20. The support of the plate 52 inhibits excessive lateral deformation of the overlay 50 during engagement with the step chain 20.

Figures 4, 5:
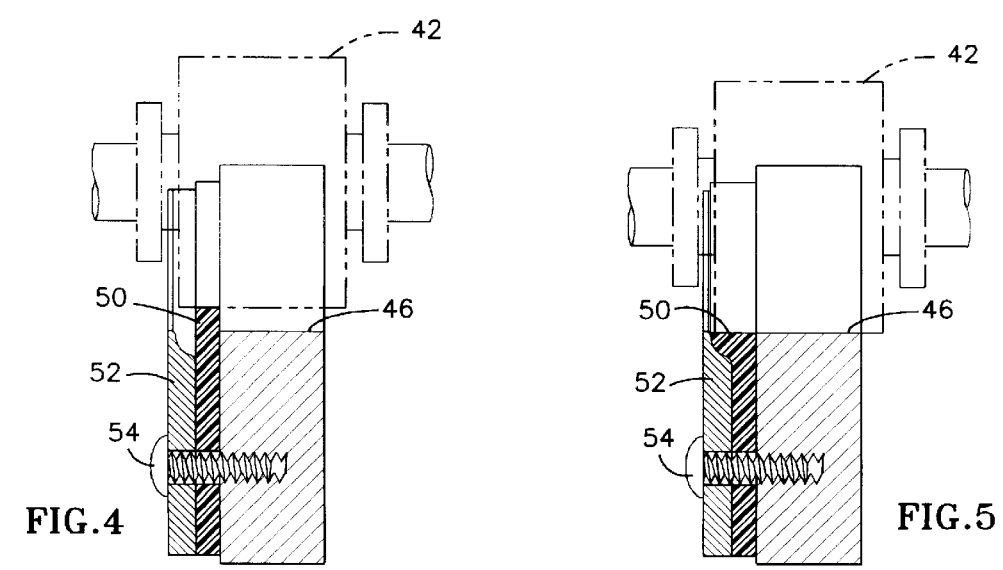
FIG. 4 a side view of the drive sprocket taken along line 4—4 of FIG. 3 with the bushing at initial engagement of the overlay.
FIG. 5 a side view of the drive sprocket taken along line 4—4 of FIG. 3 with bushing fully engaged with the drive sprocket.

Referring to FIGS. 4 & 5, during the operation of the escalator, the bushing 42 initially engages the overlay 50. As the step chain drive sprocket 30 rotates, the bushing 42 is cushioned as it descends to contact the root area 46. The overlay 50 plastically deforms under the load such that it flows into the parabolic channel along the rim of the plate 52. Upon contact with the root area 46, the overlay 50 is compressed by the bushing 42 and the load of the step chain 20 is carried by the step chain drive sprocket 30. As the step chain drive sprocket 30 continues to rotate, the bushing 42 disengages from the root area 46 and is propelled forward. After disengagement with the bushing 42, the overlay 50 returns to its undeformed shape, i.e., the edge of the overlay 50 extends above the root area 46, until the overlay 50 engages another bushing 42.

It should be noted that while this embodiment entails an overlay that is made of polyurethane, the overlay can be made of any suitably pliant and resilient material. Some examples would be plastic or rubber. This embodiment also entails a series of overlays and plates arranged circumferentially around the step chain drive sprocket; however, the overlay, as well as the plate, could be a single piece device. It should be noted, however, that the plurality of adjacent overlays as shown in FIG. 3 facilitates replacement of individual overlay segments that may become damaged during use. Furthermore, the means of attachment in this embodiment is a removable fastener. The overlay can be attached by any number of means, such as bonding. The screw type fasteners shown and described, in conjunction with using a plurality of overlay segments, make the replacement of the overlay segments quick and simple.

Although this invention has been shown and described with respect to the detailed embodiments thereof, it will be understood by those skilled in the art that various changes in form and detail thereof may be made without departing from the spirit and scope of the claimed invention.

What is claimed is:

1. A drive sprocket for propelling a chain, the drive sprocket having a plurality of teeth with root areas between adjacent teeth, an overlay made of a flexible material attached to a side of the drive sprocket, and a plate, the overlay extending across adjacent sprocket teeth and extending radially outward from the root area such that the chain engages the overlay prior to engaging the drive sprocket, wherein the plate is aligned with the contour of the root areas between adjacent teeth and attached to the side of the drive sprocket to support the overlay during engagement with the chain, and wherein the plate has a channel along its rim adapted to receive the deformed overlay.

2. A device as in claim 1 further comprising:
   a fastener to removably attach the overlay to the sprocket.

3. A device as in claim 1 wherein the overlay comprises:
   a plurality of overlay segments arranged circumferentially around the drive sprocket.

4. The device according to claim 3, wherein the plate comprises a plurality of the plate segments, that are aligned with the contour of the drive sprocket teeth, for supporting each overlay segment during engagement with the chain.

5. The device according to claim 4, further including a fastener that removably attaches the overlay segments to the drive sprocket.

6. An overlay for a step chain drive sprocket of a passenger conveying system, the passenger conveying system having a step chain, the drive sprocket having a plurality of teeth with root areas between adjacent teeth to engage the step chain and a plate aligned with the contour of the drive sprocket teeth and attached to the side of the drive sprocket to support the overlay during engagement with the chain, wherein the plate has a channel along its rim adapted to receive the deformed overlay, the overlay being made of a flexible material and attached to a side of the step chain drive sprocket, the overlay extending across adjacent sprocket teeth and extending radially outward from the root area, such that the step chain engages the overlay prior to engaging the step chain drive sprocket.

7. A device as in claim 6 further comprising:
   a fastener to removably attach the overlay to the step chain drive sprocket.

8. A device as in claim 6, wherein the overlay comprises:
   a plurality of overlay segments arranged circumferentially around the step chain drive sprocket.

9. The device according to claim 8, wherein the plate comprises a plurality of plate segments, that are aligned with the contour of the step chain drive sprocket teeth, for supporting each overlay segment during engagement with the step chain.

10. The device according to claim 9, further including a fastener that removably attaches the overlay segments to the step chain drive sprocket.

11. A passenger conveyor comprising:

a step chain drive sprocket having a plurality of teeth with root areas between adjacent teeth;

an overlay made of flexible material that is attached to a side of the step chain drive sprocket, the overlay extending across adjacent sprocket teeth and extending radially outward of the root area, such that the step chain engages the overlay prior to engaging the step chain drive sprocket; and a plate aligned with the contour of the drive sprocket teeth and removably attached through the overlay to the side of the drive sprocket to support the overlay during engagement with the chain, wherein the plate has a channel along its rim adapted to receive the deformed overlay.

12. A device as in claim 11 comprising:

a fastener to removably attach the overlay to the step chain drive sprocket.

13. A device as in claim 11, wherein the overlay comprises:

a plurality of overlay segments arranged circumferentially around the step chain drive sprocket.

14. The device according to claim 13, wherein the plate comprises a plurality of plate segments, that are aligned with the contour of the step chain drive sprocket teeth, to support each overlay segment during engagement with the step chain.

15. The device according to claim 14, further including a fastener that attaches the overlay segments to the step chain drive sprocket.

16. A device as in claim 11, wherein the passenger conveyor is an escalator.

* * * * *